United States Patent [19]
Brunell et al.

[11] Patent Number: 5,381,226
[45] Date of Patent: Jan. 10, 1995

[54] FLEXIBLE GUIDE TUBE ASSEMBLY

[75] Inventors: Robert A. Brunell, Webster; John M. Smith, Southbridge, both of Mass.

[73] Assignee: Schott Fiber Optics, Southbridge, Mass.

[21] Appl. No.: 91,710

[22] Filed: Jul. 15, 1993

[51] Int. Cl.$^6$ .................. G02B 23/24; G02B 23/26
[52] U.S. Cl. ................................................ 356/241
[58] Field of Search ................................. 356/241

[56] References Cited

U.S. PATENT DOCUMENTS

| | | | |
|---|---|---|---|
| 3,690,775 | 9/1972 | Cousins | 356/241 |
| 3,778,170 | 12/1973 | Howell et al. | 356/241 |
| 3,917,432 | 11/1975 | Feuerstein et al. | 356/241 X |
| 4,784,463 | 11/1988 | Miyazaki | 356/241 X |

OTHER PUBLICATIONS

Olympus Industrial Remote Visual Inspection (RVI) for the Airlines, advertisement/brochure, 10 pages.

Primary Examiner—Vincent P. McGraw
Attorney, Agent, or Firm—Millen, White, Zelano, & Branigan

[57] ABSTRACT

In accordance with an embodiment of the present invention, a hollow, flexible guide tube assembly is provided which is a combination of a front elbow attached to a flexible tubular coil spring which is attached to a hollow, tubular handle section, forming a continuous tubular compartment in a configuration that permits the inspector to penetrate and view the inside of an engine through an external access port. The assembly further may comprise an adjustable mounting flange, attachable to an engine bulkhead, movable along the tubular axis of a tubular handle attached to the flexible coil spring that frees the operator from holding the guide tube while performing the inspection. The flexible guide tube assembly facilitates passage of the endoscope into an inaccessible location of device which is to be visually inspected. The flexible guide tube assembly guides the endoscope past obstacles and large gaps that make insertion time consuming, laborious, and damaging to the endoscope.

6 Claims, 2 Drawing Sheets

FLEXIBLE GUIDE TUBE ASSEMBLY

BACKGROUND OF THE INVENTION

Endoscopes have a variety of useful applications in industry for penetrating and viewing locations which are not otherwise directly accessible. For example, to inspect the inside of a jet engine without disassembling it, an endoscope may be inserted through an entry port into the engine, thereby permitting the viewer to look inside. The ability to inspect the inside of an engine is an especially important way of assessing damage, structural integrity, repair status, and general operability.

The endoscope is generally inserted through an external opening in the structure to be inspected, such as a bleed or igniter port for a jet engine. Since the precise interior location may not be directly reached from the external port, a means may be provided to guide the endoscope to the desired position. In some circumstances, the interior location may be reached using a rigid, preformed guide tube through which the endoscope may be inserted and guided to its destination. However, when the pathway is one which would not permit access via the rigid guide tube, an alternate means must be devised for guiding the flexible endoscope, past obstacles and gaps, to the desired target. In particular, difficulty was experienced in inspecting specific areas of the 731 series engine manufactured by Garrett General Aviation Division of Allied Signal Aerospace Company.

SUMMARY OF THE INVENTION

An object of the invention is to facilitate the inspection of a desired location with an endoscope or a similar elongated flexible probe. It is also an object of the invention to provide a new and improved means for penetrating and inspecting interior locations.

In accordance with an embodiment of the present invention, a hollow, flexible guide tube assembly is provided which is a combination of a front elbow attached to 10 a flexible tubular coil spring which is attached to a hollow, tubular handle section, forming a continuous tubular compartment in a configuration that permits the inspector to penetrate and view the inside of an engine through an external access port. The assembly further may comprise an adjustable mounting flange, attachable to an engine bulkhead, movable along the tubular axis of a tubular handle attached to the flexible coil spring that frees the operator from holding the guide tube while performing the inspection.

The flexible guide tube assembly facilitates passage of the endoscope into an inaccessible location of the device which is to be visually inspected. The flexible guide tube assembly guides the endoscope past obstacles and large gaps that make insertion time consuming, laborious, and damaging to the endoscope.

The invention also relates to an adjustable mounting flange which may be affixed to any position along a guide tube handle. The adjustable mounting flange may be used on other guide tubes, e.g., a spiral guide tube, where the guide tube is a means to guide the endoscope probe through the interior space to be inspected.

Generally, the guide tube assembly can be inserted through an external port in the structure to be inspected; e.g., the bleed port of an engine. The front elbow can be inserted first through the port, and can be pushed through to the desired location, using the flexible coil spring to urge the elbow forward. Once the desired location is reached, the adjustable clamping means can be secured to the guide tube handle and the mounting plate can be attached to the engine bulkhead. The endoscope can be inserted through the entrance of the tubular handle and exited out the exit end of the elbow section.

By attaching the flexible guide assembly to the engine, the operator is not required to hold it and therefore his hands may be used to manipulate the flexible probe, instead. For example, the operator is therefore permitted to hold the handle of the endoscope with one hand and control its articulating tip. With the other hand, he can feed the endoscope through the guide tube and into the engine where visual inspection is commenced.

The invention includes a flexible guide tube assembly for endoscopic inspection of an engine comprising, (a) a tubular front elbow section for guiding an endoscope through an interior space, the elbow section having an entrance end and an exit end through which an endoscope can be exited;

(b) a tubular flexible coil spring section for urging the tubular front elbow section through the interior space, the coil spring having an entrance end and an exit end, wherein the entrance end of the elbow section is attached to the exit of the coil spring section forming a continuous tubular compartment;

(c) a tubular handle section having an entrance end through which an endoscope can be inserted and an exit end, wherein the entrance end of the coil spring section is attached to the exit end of the handle section forming a continuous tubular compartment; and (d) an adjustable mounting flange movable along the tubular axis of the handle section, the adjustable mounting flange having a mounting plate and an adjustable clamping means secured to the mounting plate for immobilizing the mounting plate at a position on the tubular handle section; the mounting plate having a plurality of fasteners for attaching it to the engine.

Upon further study of the specification and appended claims, further objects and advantages of this invention will become apparent to those skilled in the art.

BRIEF DESCRIPTION OF DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
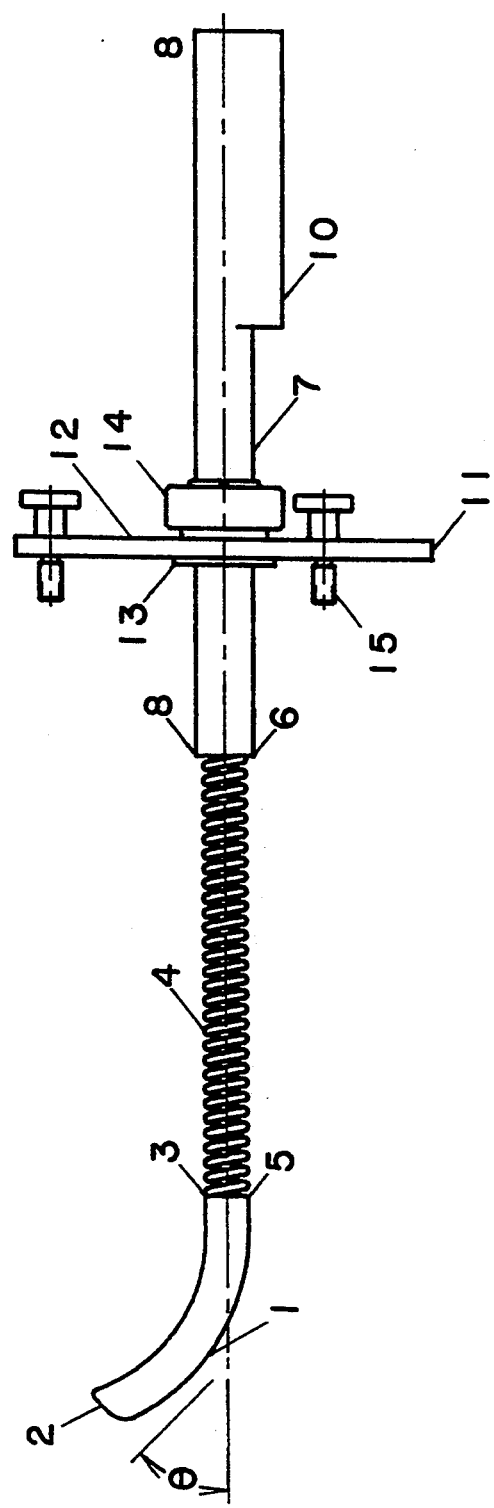
FIG. 1 is a perspective view of a flexible guide tube assembly according to an embodiment of the invention.

FIG. 1 shows a flexible guide tube assembly. The front tubular elbow 1 of the guide tube assembly is a hollow, elbow, cylinder having an exit end 2 through which an endoscope or other probe can be exited and an entrance end 3. The elbow is a means to guide an endoscope or other probe in a direction off the straight axis of the guide tube assembly. The curvature and angle at which the elbow points can be determined by the interior of the particular space which is to be inspected. For example, for inspecting a 731 series engine manufactured by Garrett General Aviation Division of Allied Signal Aerospace Company, the elbow may be pointing 52°. The angle $\theta$ of pointing is indicated in FIG. 1. The angle $\theta$ is shown with respect to the axis of the continuous tubular compartment formed by the spring 4 and guide tube handle 7. Although 52° is preferred for inspecting through the access port of the 731 series engine, other pointing angles may be employed for the purpose of reaching the desired interior location. The elbow can be manufactured from conventional material having suitable durability, e.g., stainless steel. The elbow section must be large enough for an endoscope or other flexible probe to pass through and small enough to fit through a port, e.g., the access port of an engine. Therefore, the outer and inner diameters of the elbow section are controlled by the size and circumstances of the article to be inspected. The outer diameter of the tubular elbow can be about 0.375 inches and the inner diameter can be about 0.275 inches. The length of the elbow can be about 1.5 inches. The entrance end 3 of the tubular elbow section 1 of the guide tube assembly is attached to the exit end 5 of the flexible tubular coil spring 4. The means for attaching the two sections together can be as conventional in the art; e.g., by brazing, soldering, or welding. The flexible tubular coil spring 4 is a straight hollow cylinder whose dimensions are controlled by the size and circumstances of the article to be inspected; e.g., having an outer diameter of 0.375 inches, an inner diameter of 0.249 inches, formed from 0.063 inch diameter wire and having a pitch of eight turns an inch. The flexible coil spring is a means to control the movement of the elbow through the interior space; i.e., by deflection of a load applied to the front tubular elbow thereby urging the elbow forward through the interior of the space to be inspected. The flexible coil spring 4 also provides the operator with the flexibility to penetrate the interior of an engine, since it can bend and move past obstacles. The configuration of the flexible coil spring 4 attached to the elbow 7 therefore permit inspection of interior locations that could not be accessed using a preformed, rigid guide tube.

The entrance end 6 of the tubular coil spring 4 is attached to the exit end 8 of the guide tube handle 7. The attachment can be accomplished conventionally, e.g., through brazing, soldering, or welding. The guide tube handle is a hollow cylindrical tube having an exit end 8 and an entrance end 9 through which the endoscope or other probe can be entered. The material and dimensions of the guide tube handle can be selected as they are for the elbow section. The guide tube handle may have a grip 10, for gripping the guide tube assembly as it is urged through the interior space. The grip 10 can be of a particular circular dimension to permit it to be readily grasped and held by the operator. A material, e.g., rubber, may also be attached the grip 10 if greater gripping resistance is required.

The adjustable mounting flange 11 is movable along the axis of the guide tube handle 7. It can also be rotated on the handle 7 prior to locking at the preferred setting. Typically, it can comprise a mounting plate 12 having a circular hole through the center thereof and adjustable clamping means having a clamping collar 13 and a lock nut 14 seated on the clamping collar 13. The mounting plate 12 can be manufactured from a suitable material, e.g., stainless steel. Its dimensions are defined by the article to which it is to be attached, e.g., a bulkhead of an engine. The diameter of the circular hole is defined by the outer diameter of the guide tube handle 7. The clamping collar 13 and lock nut 14 provide a means for immobilizing the mounting plate 12. They can be manufactured to the dimensions required to fit the handle 7 and mounting plate 12. Other locking arrangements may also be employed to achieve the same result, i.e., movable along a guide tube handle 7 which may be fixed or immobilized at a desired position. The guide tube handle 7 can be inserted through the clamping collar 13. The adjustable mounting flange 11 can be secured to the guide tube handle by tightening the lock nut 14 against the clamping collar 13 upon which it is seated. The adjustable mounting flange 11 can be attached to the article which is to be inspected, e.g., the bulkhead of an engine, by a plurality of fasteners, e.g., a machine screw 15, which piece the mounting plate 12 and attach to a plurality of female threaded bosses mounted on the engine bulkhead. The fasteners can be selected so they fit the bulkhead attachment boss, e.g., the fastener may be a male screw which fits a threaded female boss mounted on the engine bulkhead. The fasteners may be spaced at 120° intervals as shown in FIG. 1 (the third is behind the clamping collar 14 and therefore can not be seen) but the fastener 15 arrangement is controlled by the engine bulkhead, or other article to which the mounting plate is to be attached, i.e., the mounting plate 12 having a plurality of fasteners 15 aligned to a plurality of receiving ends or bosses on the engine bulkhead. By securing the flexible guide tube assembly to the opening, i.e., the access port, through the adjustable mounting flange 11, the operator is therefore freed from holding the guide tube assembly. The operator is able to manipulate the flexible probe; e.g., he may feed the endoscope through the guide tube assembly with one hand and control its articulating tip with the other hand.

In a preferred embodiment, the flexible guide tube assembly may be used to guide an endoscope into the Garrett 731 series engines. The mounting plate 12 mounts via the fasteners or machine screws 15 to the left or right access ports of the engine. The operator can therefore inspect the HP compressor inlet and/or the LP compressor exit areas.

Figure 2:
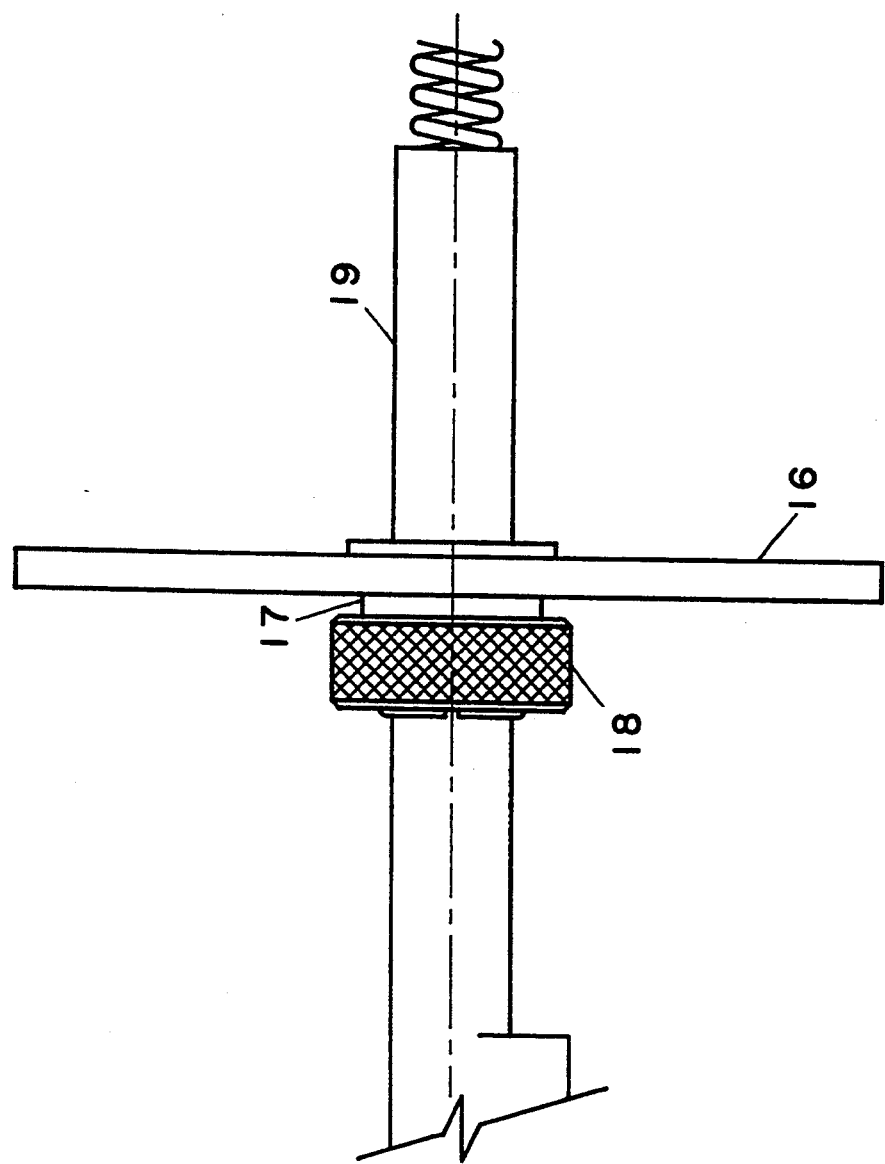
FIG. 2 is a perspective view of an adjustable mounting flange used according to an embodiment of the invention.

FIG. 2 shows an enlarged view of the adjustable mounting flange assembly. The clamping collar 17 is inserted through a circular hole through the mounting plate 16. The clamping collar 17 can be externally threaded. A locking nut 18 can be internally threaded and is therefore screwed around it. The lock nut may contain deformed or undersize threads, variable lead angles, plastic or fiber washers, or plug inserts, which resist unscrewing, thereby immobilizing the attached plate 16 to the guide tube handle 19.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A flexible guide tube assembly for endoscopic inspection of an engine comprising,
   (a) a tubular front elbow section for guiding an endoscope through an interior space, the elbow section having an entrance end and an exit end through which an endoscope can be exited;

(b) a tubular flexible coil spring section for urging the tubular front elbow section through the interior space, the coil spring having an entrance end and an exit end, wherein the entrance end of the elbow section is attached to the exit of the coil spring section forming a continuous tubular compartment;

(c) a tubular handle section having an entrance end through which an endoscope can be inserted and an exit end, wherein the entrance end of the coil spring section is attached to the exit end of the handle section forming a continuous tubular compartment; and (d) an adjustable mounting flange movable along the tubular axis of the handle section, the adjustable mounting flange having a mounting plate and an adjustable clamping means secured to the mounting plate for immobilizing the mounting plate at a position on the tubular handle section; the mounting plate having a plurality of fasteners for attaching it to the engine.

2. The flexible guide tube assembly according to claim 1 wherein, the mounting plate has a circular hole through the center thereof;

the adjustable clamping means comprises a lock nut having internal threads and a clamping collar having external threads, the lock nut seated on the clamping collar;

the clamping collar is secured through the circular hole of the mounting plate; and the tubular handle section is inserted through the clamping collar.

3. The flexible guide tube assembly according to claim 1, wherein the plurality of fasteners are each 120° apart.

4. The flexible guide tube assembly according to claim 1, wherein the mounting plate can be attached to the bulkhead of a 731 series Garrett General Aviation engine by the plurality of fasteners.

5. The flexible guide tube assembly according to claim 1, wherein the elbow section points at 52°.

6. An apparatus for inspecting the inside of an engine comprising, a flexible guide tube assembly according to claim 1 and an endoscope.

* * * * *